United States Patent
Weeks, Jr. et al.

[11] Patent Number: 5,806,588
[45] Date of Patent: Sep. 15, 1998

[54] HEAT TRANSFER APPARATUS AND METHOD FOR TUBES INCORPORATED IN GRAPHITE OR CARBON/CARBON COMPOSITES

[75] Inventors: Joseph K. Weeks, Jr., Salt Lake City; Jared L. Sommer, North Salt Lake, both of Utah

[73] Assignee: Technical Research Associates, Inc., Salt Lake City, Utah

[21] Appl. No.: 442,465

[22] Filed: May 16, 1995

[51] Int. Cl.⁶ .................................. F28F 1/20; B32B 9/00
[52] U.S. Cl. ............................... 165/181; 428/408
[58] Field of Search ..................... 165/184, 181, 165/180, 133; 428/408, 113

[56] References Cited

U.S. PATENT DOCUMENTS

| | | | |
|---|---|---|---|
| 2,782,806 | 2/1957 | Stambaugh et al. | 138/76 |
| 3,415,316 | 12/1968 | Burne et al. | 165/181 |
| 3,595,310 | 7/1971 | Burne et al. | 165/181 X |
| 3,825,064 | 7/1974 | Inoue | 165/181 X |
| 4,075,376 | 2/1978 | Jaeger | 165/180 X |
| 4,134,451 | 1/1979 | Conant et al. | 165/133 |
| 4,474,233 | 10/1984 | Swozil | 165/184 |
| 4,852,645 | 8/1989 | Coulon et al. | 165/180 |
| 4,998,584 | 3/1991 | Foglesonger et al. | 165/180 X |
| 5,107,798 | 4/1992 | Gerep | 165/181 X |
| 5,150,748 | 9/1992 | Blackmon et al. | 165/181 X |

FOREIGN PATENT DOCUMENTS

| | | | |
|---|---|---|---|
| 0074949 | 6/1977 | Japan | 165/181 |
| 0083595 | 4/1988 | Japan | 165/180 |

Primary Examiner—Charles Jordan
Assistant Examiner—Theresa M. Wesson
Attorney, Agent, or Firm—J. Winslow Young

[57] ABSTRACT

A novel heat transfer apparatus and method including a body of carbon/carbon material with cooling tubes brazed therein. The carbon/carbon material includes carbon, graphite, carbon fibers, graphite fibers and combinations of the same and silicon carbide and boron carbide. The cooling tubes are prepared from stainless steel, nickel and its alloys, cobalt and its alloys, copper, molybdenum, molybdenum rhenium alloy, and carbon. A wetting agent is applied to the carbon surfaces to protect the carbon surfaces from attack by the molten brazing material and is selected from molybdenum niobium, tantalum, tungsten, and carbides of these refractory metals. The brazing material is selected from copper, copper alloys, silver, and gold. Advantageously, the wetting agent not only protects the carbon surfaces from attack by the brazing metals but its surface tension therewith holds the brazing metal into intimate thermal contact between the carbon surface and the cooling tubes even while the novel heat transfer apparatus of this invention is operating at temperatures above the melting temperature of the brazing metal.

13 Claims, 3 Drawing Sheets

HEAT TRANSFER APPARATUS AND METHOD FOR TUBES INCORPORATED IN GRAPHITE OR CARBON/CARBON COMPOSITES

GOVERNMENTAL SUPPORT

This invention has been supported, in part, under Contract No. F33657-93-C-2235 administered by the Joint Program Office, Aeronautical Systems Center, Wright-Patterson Air Force Base, the United States Air Force.

BACKGROUND

1. Field of the Invention

This invention relates to heat transfer apparatus for high temperature and high heat flux applications and, more particularly, to a novel cooling tube in a carbon matrix wherein the cooling tubes are intimately brazed to the carbon matrix through the use of a refractory metal wetting agent, the refractory metal wetting agent holding the braze in place between the carbon matrix and the cooling tube even at temperatures above the melting temperature of the braze.

2. The Prior Art

Advanced research in the fields of fusion reactors and hypersonic aircraft propulsion systems has created a need for high temperature materials and heat transfer systems capable of withstanding the high temperatures and conditions of high thermal flux encountered in these applications. One material found to be especially advantageous for use under these conditions is carbon and/or graphite. Carbon/graphite is capable of withstanding relatively high temperatures and conditions of high thermal flux while maintaining its structural integrity. Additional structural strength is provided in the carbon structure by forming the carbon/graphite structure with carbon, graphite, carbon fibers, and graphite fibers along with combinations of these forms of carbon. We, therefore, have selected the term "carbon/carbon" as a generic term for these materials. Other suitable materials are those materials based on carbon which have significant levels of other ingredients intended to improve the oxidation resistance of carbon such as silicon and boron.

The removal of the significant amount of thermal energy imposed on these carbon/carbon materials represents a significant problem in that it is nearly impossible to achieve an intimate bond between the carbon/carbon material and the surface of cooling tubes embedded therein. One reason for this difficulty is the fact that it is nearly impossible to mechanically achieve an intimate thermal coupling between a cooling tube and the carbon/carbon material by machining a throughbore in the carbon/carbon material and then inserting therein the cooling tube. Even minor variations in the preparation of the throughbore and/or variations in the external profile of the cooling tube will result in discontinuities between the surface of the cooling tube and its interface with the carbon/carbon material. Another problem is that the cooling tube will have a different coefficient of thermal expansion from that of the carbon/carbon material so that cracks or other discontinuities can arise which will, in turn, interfere with the efficient transfer of thermal energy from the carbon/carbon material to a cooling fluid flowing through the cooling tubes.

One prior art solution to this problem has been to cast the cooling tubes directly into the carbon/carbon material. This procedure adds considerably to the cost of the overall structure due to the high temperatures involved and the precision with which the structure must be prepared. For example, if one were to cast a cooling tube of, say, molybdenum, into a carbon/carbon material one can readily recognize the significant technical hurdles and costs involved. Perhaps the greatest difficulty in achieving an intimate thermal coupling between the surface of the carbon/carbon material and the material of the cooling tube is that most cooling tube materials attack carbon at the molten temperature of the cooling tube material. Accordingly, even those systems involving the direct casting of the cooling tubes into the carbon/carbon material will encounter this phenomena of surface degradation of the carbon/carbon material by the molten cooling tube material.

In view of the foregoing it would be a significant advancement in the art to provide a carbon/carbon material having cooling tubes intimately bonded therein. It would be another advancement in the art to provide a brazing method for intimately bonding cooling tubes into a carbon/carbon material. It would also be an advancement in the art to bond cooling tubes into a carbon/carbon material using a wetting agent which holds the brazing agent in intimate contact with the carbon/carbon material even at temperatures significantly above the melting temperature of the brazing agent. Such a novel apparatus and method is disclosed and claimed herein.

BRIEF SUMMARY AND OBJECTS OF THE INVENTION

This invention is a novel heat transfer apparatus involving a cooling tube brazed in a carbon/carbon material so that the cooling tube is intimately bonded to the carbon/carbon material. The cooling tubes can be prepared from any suitable material such as stainless steel, nickel and its alloys, cobalt and its alloys, copper, molybdenum, molybdenum/rhenium alloy, carbon, and the like. The carbon surfaces are coated with a wetting agent for the brazing material. These wetting agents are refractory metals and their carbides, and include the metals of molybdenum, tungsten, tantalum, and niobium. The preferred brazing material is copper due to its high thermal conductivity, cost, and availability although silver and gold would also make excellent brazing materials. Pure copper is preferred over its alloys to maximize thermal conductivity of the braze. Importantly, the wetting agents hold the brazing material in intimate contact with both the carbon/carbon material and the cooling tubes even at temperatures significantly above the melting temperature of the brazing material.

It is, therefore, a primary object of this invention to provide improvements in carbon/carbon materials having cooling tubes bonded therein.

Another object of this invention is to provide improvements in the method of bonding cooling tubes in a carbon/carbon material.

Another object of this invention is to provide a carbon/carbon material having a cooling tube intimately bonded therein.

Another object of this invention is to provide a carbon/carbon material with a cooling tube, the cooling tube having been brazed in situ using a refractory metal or a carbide of the refractory metal as the wetting agent for the carbon/carbon material.

Another object of this invention is to provide a carbon/carbon material with a carbon cooling tube, the carbon cooling tube having been brazed in situ in the carbon/carbon material.

These and other objects and features of the present invention will become more readily apparent from the following description and the appended claims.

DETAILED DESCRIPTION OF THE PREFERRED EMBODIMENT

The invention is best understood from the following description with reference to the drawings wherein like parts are designated with like numerals throughout and also in conjunction with the claims.

General Discussion

The novel invention disclosed herein relates to a heat transfer apparatus and method whereby cooling tubes are intimately bonded in a carbon/carbon material with a metal such as copper which has a high coefficient of thermal conductivity to assure optimal heat transfer from the carbon/carbon material into the cooling tubes. The carbon/carbon material is any suitable carbon material whether carbon, graphite, carbon fibers, graphite fibers, or combinations of the same. The term "carbon/carbon" is intended to cover any of these combinations. Carbon/carbon material is used for high temperature and/or high heat flux conditions due to its ability to withstand these temperatures and its thermal conductivity.

The cooling tubes are fabricated from any suitable material such as stainless steel, molybdenum, molybdenum rhenium alloys, carbon, or the like. Advantageously, we have discovered that if we coat the carbon surfaces with a refractory metal or a carbide form of the refractory metal that these materials not only protect the carbon surfaces against attack by the brazing metal but also cause the brazing metal to intimately bond the cooling tube to the carbon surfaces by acting as a wetting agent. Perhaps even more importantly, we have found that the wetting agents of this invention hold the brazing metal through surface tension forces so that even at temperatures above the melting temperature of the brazing metal the brazing metal is held in place and thereby continues to transfer thermal energy from the carbon/carbon material to the cooling tubes.

The heat transfer apparatus of this invention is prepared by drilling or otherwise forming bores through the carbon/carbon material. The carbon surfaces of these bores are then coated with a layer of the wetting agent after which the cooling tubes are placed in the bores. The cooling tubes are then brazed to the carbon/carbon material by melting the brazing metal at the external interface between the cooling tubes and the carbon/carbon material where capillary forces draw the molten brazing metal into the space between the cooling tube and the carbon/carbon material. In this manner, the cooling tubes are intimately bonded to the carbon/carbon material to provide optimal thermal contact between these two elements.

Detailed Description

Figure 1:
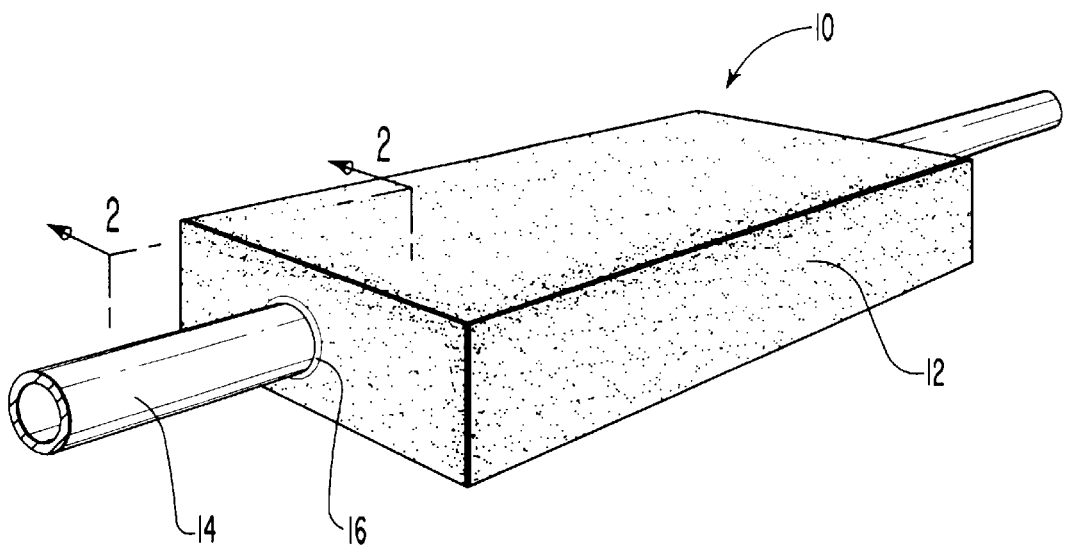
FIG. 1 is a perspective view of a first preferred embodiment of this invention showing a cooling tube in a carbon/carbon material.
Figure 2:
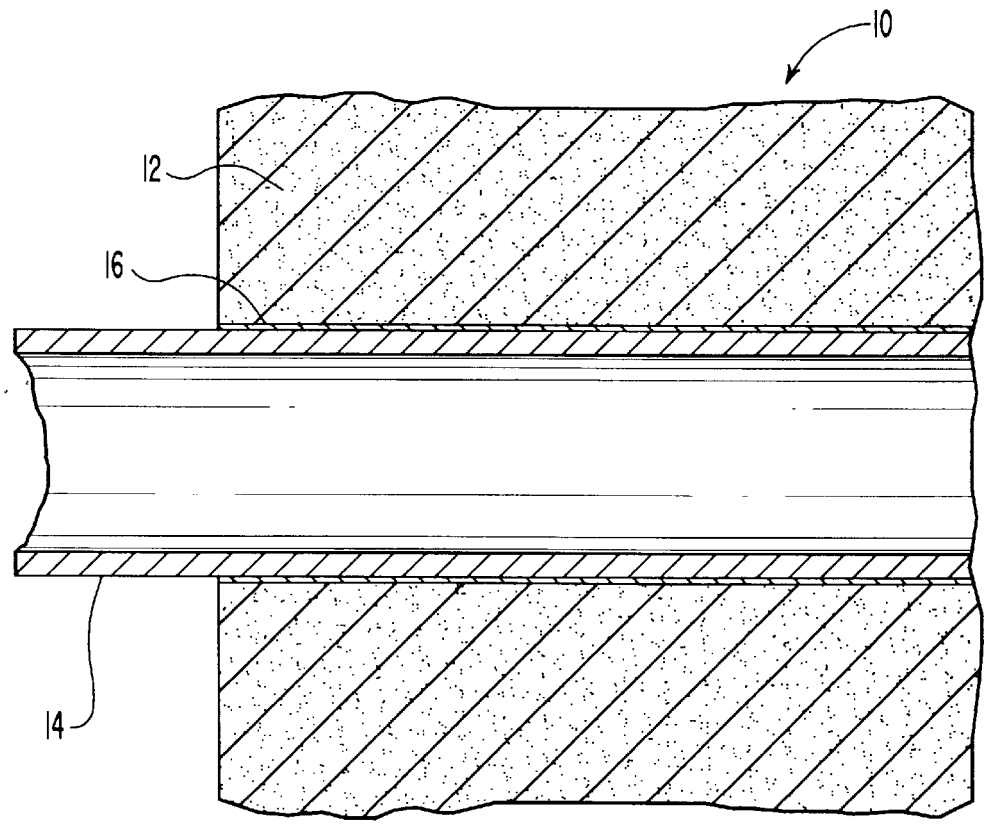
FIG. 2 is an enlarged, fragmentary, cross-sectional view taken along lines 2—2 of FIG. 1 and showing the intimate bonding of the cooling tube in the carbon/carbon material.

Referring now to FIGS. 1 and 2, the novel heat transfer apparatus of this invention is shown generally at 10 and includes a block of carbon/carbon material 12 having a cooling tube 14 embedded therein by a braze 16. Carbon/carbon material 12 is any suitable ceramic structural member which can be coated with the refractory metal layer and can include, for example, carbon, graphite, carbon fibers, graphite fibers, silicon carbide, boron carbide and combinations of the same, to name a few. Accordingly, the term "carbon/carbon" is used in a generic sense to indicate that carbon/carbon material 12 is any suitable carbon material that can be adapted for the thermal conditions that are anticipated to be encountered in the particular working environment (not shown) for the carbon/carbon material.

Cooling tube 14 is fabricated from any suitable material for both the expected temperature to be encountered and the coolant (not shown) to be passed therethrough. Representative materials of construction for cooling tube 14 include, for example, stainless steel, nickel and its alloys, cobalt and its alloys, copper, molybdenum, molybdenum rhenium alloy, carbon, and the like. Importantly, the selection of the material of construction is a function of the operating environment for the same.

Braze 16 is any suitable brazing material that also has high thermal conductivity. Copper is one of the better materials for braze 16 both because of its high thermal conductivity and its relatively low cost. Copper alloys can also be used as braze 16 especially for brazing copper tubes, although copper alloys have been generally found to be less satisfactory than pure copper. Clearly, of course, both silver and gold exhibit excellent thermal conductivity and brazing capabilities although for most applications the cost for these materials is prohibitive.

Figure 3:
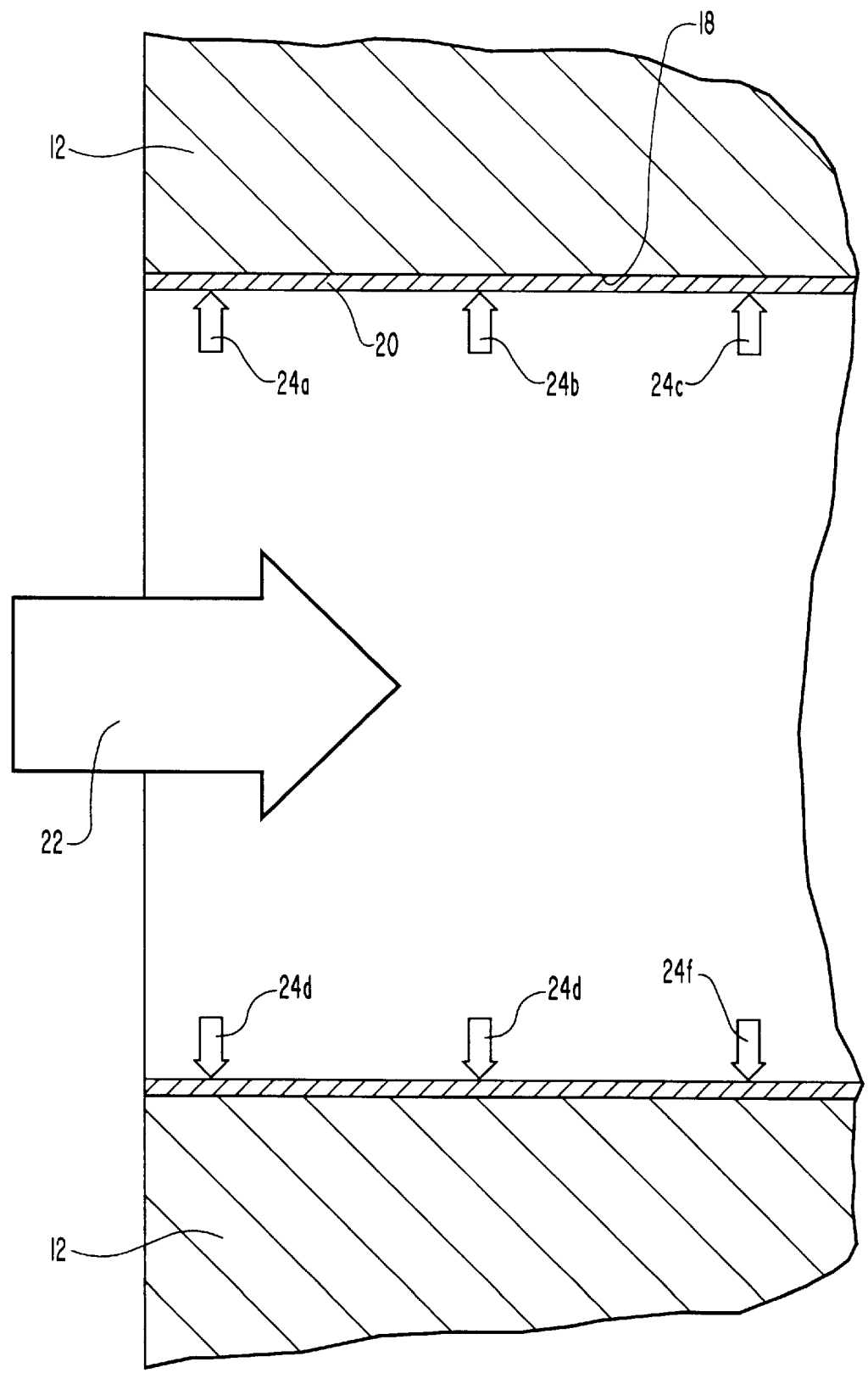
FIG. 3 is a greatly enlarged, fragmentary, cross-sectional view of the carbon/carbon material schematically illustrating the deposition of the wetting agent on the surface of the carbon/carbon material preparatory to insertion of the cooling tube.

Referring now to FIG. 3, carbon/carbon material 12 is shown having a throughbore 18 therethrough and with throughbore 18 being internally coated with wetting agent 20. Wetting agent 20 is selected from a suitable material that both protects the carbon surface of throughbore 18 and also causes braze 16 (FIGS. 1 and 2) to intimately bond therewith. We have found that refractory metals and the carbide forms of these metals provide satisfactory results for both these purposes. These refractory metals include tungsten, tantalum, molybdenum, and niobium. As illustrated, wetting agent 20 in this one schematic illustration for depositing wetting agent 20 on the surface of throughbore 18 is introduced as a precursor 22 which is passed through throughbore 18 and therein deposits wetting agent 20 as shown schematically by deposit arrows 24a–24f. The carrier medium for precursor 22 can be any suitable carrier medium such as a gas, water, alcohol, or the like. After deposition of wetting agent 20 has been achieved by deposit arrows 24a–24f, the carrier medium is removed to leave behind a suitable layer of wetting agent 20.

Figure 4:
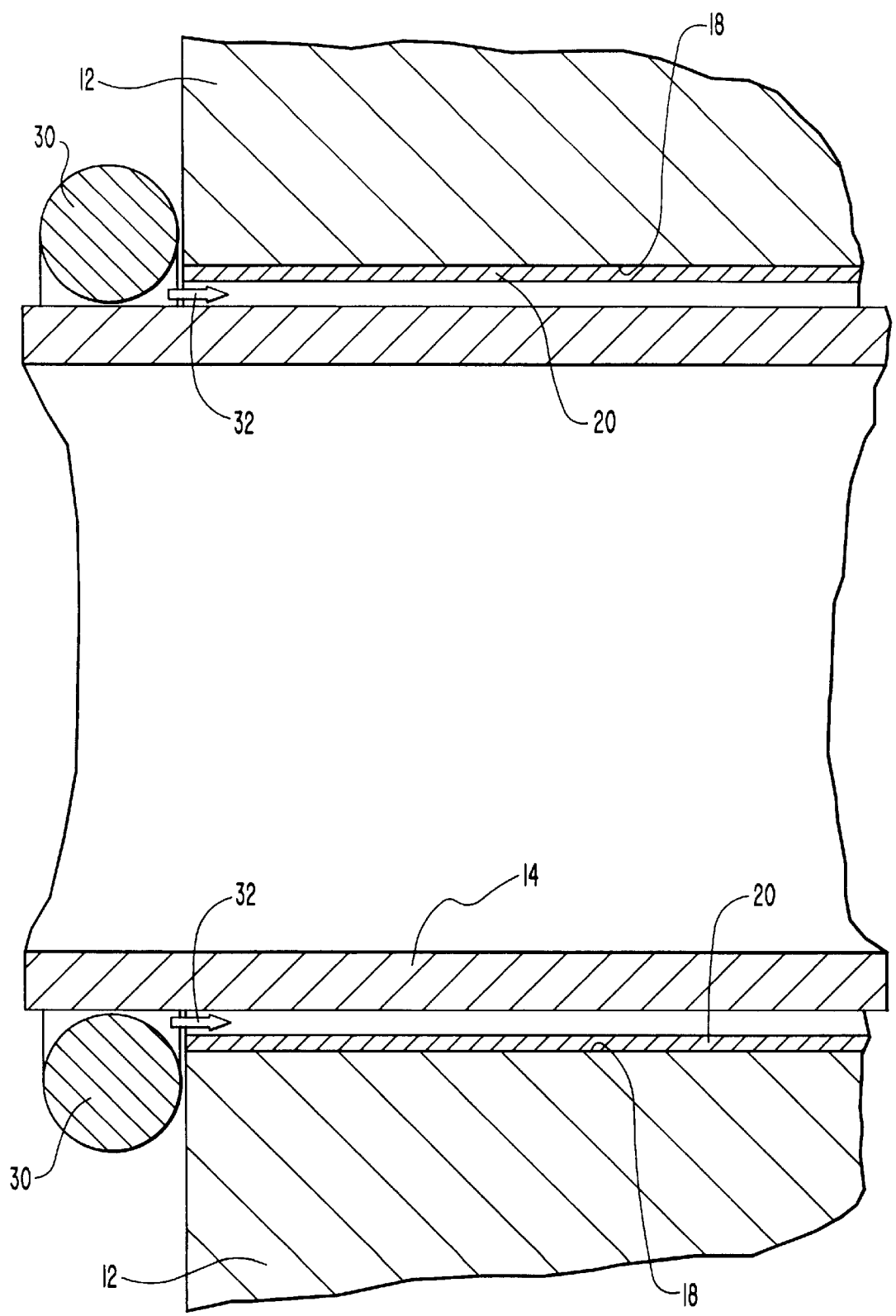
FIG. 4 is the greatly enlarged, fragmentary, cross-sectional view of FIG. 3 showing the cooling tube being brazed in the carbon/carbon material.

Referring now to FIG. 4, cooling tube 14 is shown as having been inserted into throughbore 18 and surrounded by wetting agent 20. With cooling tube 14 in place in carbon/carbon material 12, a ring of copper 30 is placed around cooling tube 14 at the external interface between cooling tube 14 and carbon/carbon material 12. The application of heat melts copper 30 to produce molten copper 32. The wetting action of wetting agent 20 draws molten copper 30 into the space between cooling tube 14 and wetting agent 20 by capillary action. Molten copper 32 thus becomes braze 16 (FIGS. 1 and 2) to securely bond cooling tube 14 in carbon/carbon material 12 into intimate thermal contact therewith. Advantageously, wetting agent 20 holds braze 16 by surface tension to carbon/carbon material 12 so that even under high temperature applications above the melting temperature of copper 30 braze 16 remains in place and serves as the thermal bridge between carbon/carbon material 12 and cooling tube 14. Importantly, the presence of wetting agent 20 keeps braze 16 in place between cooling tube 14 and carbon/carbon material 12 even though braze 16 is in the molten state.

The Method

The method of this invention includes forming a throughbore 18 through carbon/carbon material 12 and lining throughbore 18 with wetting agent 20. Thereafter, cooling tube 12 is inserted into throughbore 18 and brazed in place with braze 16. Throughbore 18 can be produced by any suitable means such as by forming carbon/carbon material 12 around a mandrel (not shown) which, when removed, leaves throughbore 18 in carbon/carbon material 12. However, the simpler procedure is to simply bore throughbore 18 through carbon/carbon material 12.

Wetting agent 20 is deposited on the internal surface of throughbore 18 where it not only protects the carbon surface of throughbore 18 from attack by the action of molten copper 32 but it also creates a capillary action to draw molten copper into the spatial separation between cooling tube 14 and the surface of throughbore 18.

At this juncture it should be pointed out that in the event cooling tube 14 is fabricated from carbon it will also be necessary to produce a coating of wetting agent 20 on the surface of cooling tube 14 in order to enhance wetting of the carbon surface of cooling tube 14 by molten copper 32. The brazing of the carbon cooling tube 14 is accomplished as though carbon cooling tube 14 were metal.

Heat transfer apparatus 10 is now ready for placement into the overall heat transfer structure (not shown) and to have coolant (not shown) directed through cooling tube 14. Importantly, even through heat transfer apparatus 10 is subjected to very high temperatures, even temperatures above the melting point of braze 16, the novel wetting action of wetting agent 20 holds braze 16 in place where braze 16 continues to conduct thermal energy from carbon/carbon material 12 into cooling tube 14 and the coolant (not shown) passing through cooling tube 14.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A heat transfer apparatus comprising:
    a body of carbon material comprising a carbon selected from the group consisting of carbon graphite, carbon fibers, graphite fibers, and combinations thereof;
    a throughbore through said carbon material;
    a wetting agent lining said throughbore, said wetting agent including wetting agent materials selected from the group consisting of molybdenum, niobium, tantalum, and tungsten and carbides of said molybdenum, niobium, tantalum, and tungsten;
    a cooling tube mounted in said throughbore, said cooling tube having an external surface and being fabricated from a metal selected from the group consisting of stainless steel, nickel and its alloys, cobalt and its alloys, copper, molybdenum, and a molybdenum rhenium alloy; and
    braze means for brazing said cooling tube in said throughbore, said braze means including a braze metal selected from the group consisting of copper, copper alloy, silver, and gold.

2. The heat transfer apparatus defined in claim 1 wherein said cooling tube is fabricated from carbon and said wetting agent is also applied to said external surface of said cooling tube.

3. A heat transfer apparatus comprising:
    a heat contact surface fabricated from a carbon/carbon material;
    at least one cooling tube embedded in said carbon/carbon material;
    a wetting agent on said carbon/carbon material adjacent said cooling tube, said wetting agent being selected from the group consisting of molybdenum, niobium, tantalum, tungsten, molybdenum carbide, niobium carbide, tantalum carbide, and tungsten carbide; and
    a thermal bridge between said carbon/carbon material and said cooling tube, said thermal bridge comprising a braze bonding said cooling tube with said wetting agent.

4. The heat transfer apparatus defined in claim 3 wherein said carbon/carbon material comprises a carbon selected from the group consisting of carbon, graphite, carbon fibers, graphite fibers, combinations of said carbon, said graphite, said carbon fibers, and said graphite fibers, and silicon carbide and boron carbide.

5. The heat transfer apparatus defined in claim 3 wherein said cooling tube has an external surface and is fabricated from a metal selected from the group consisting of stainless steel, nickel and its alloys, cobalt and its alloys, copper, molybdenum, and molybdenum rhenium alloy.

6. The heat transfer apparatus defined in claim 3 wherein said cooling tube comprises a carbon cooling tube and said wetting agent is applied to the external surface of said carbon cooling tube.

7. The heat transfer apparatus defined in claim 3 wherein said thermal bridge comprises a brazing metal selected from the group consisting of copper, copper alloy, silver, and gold.

8. A method for transferring heat comprising the steps of:
    preparing a heat transfer surface from a carbon/carbon material;
    inserting at least one cooling tube in said carbon/carbon material;
    protecting the surface of said carbon/carbon material adjacent said cooling tube with a wetting agent selected from the group consisting of molybdenum, niobium, tantalum, tungsten, molybdenum carbide, niobium carbide, tantalum carbide, and tungsten carbide;
    brazing said cooling tube to said wetting agent and said carbon/carbon material with a braze, said braze having a melting temperature; and
    transferring heat through said heat transfer surface to said cooling tube.

9. The method defined in claim 8 wherein said preparing step includes selecting said carbon/carbon material from the group consisting of carbon, graphite, carbon fibers, graphite fibers, and combinations of said carbon, said graphite, said carbon fibers, and said graphite fibers.

10. The method defined in claim 8 wherein said inserting step includes selecting said cooling tube from a material selected from the group consisting of stainless steel, nickel and its alloys, cobalt and its alloys, copper, molybdenum, and molybdenum rhenium alloy.

11. The method defined in claim 8 wherein said inserting step includes preparing said cooling tube from carbon, said cooling tube having an external surface, and said protecting step includes coating said external surface of said carbon with said wetting agent.

12. The method defined in claim 8 wherein said brazing step includes selecting a braze from the group consisting of copper, copper alloy, silver, and gold, said braze having a melting temperature.

13. The method defined in claim 8 wherein said transferring step includes transferring heat to said cooling tube at a temperature above said melting temperature of said braze, said wetting agent holding said braze in a molten state between said carbon/carbon material and said cooling tube, said braze in said molten state thermally bridging between said heat transfer surface and said cooling tube.

* * * * *